United States Patent [19]

Mori et al.

[11] Patent Number: 4,521,568

[45] Date of Patent: Jun. 4, 1985

[54] SEQUENTIALLY PRODUCED MULTILAYER ACRYLIC RESIN COMPOSITION

[75] Inventors: Kyoichiro Mori, Tokyo; Hiroyuki Hirano, Yokohama, both of Japan

[73] Assignee: Asahi Kasei Kogyo Kabushiki Kaisha, Japan

[21] Appl. No.: 383,567

[22] Filed: Jun. 1, 1982

[30] Foreign Application Priority Data

Jun. 3, 1981 [JP] Japan .................................. 56-84307

[51] Int. Cl.$^3$ ............................................ C08F 265/06
[52] U.S. Cl. .................................... 525/309; 525/301; 525/305; 525/306; 525/902
[58] Field of Search ............... 525/301, 305, 306, 309, 525/902

[56] References Cited

U.S. PATENT DOCUMENTS

| | | |
|---|---|---|
| 3,661,994 | 5/1972 | Hwa et al. |
| 3,787,522 | 1/1974 | Dickie ................................ 525/309 |
| 3,793,402 | 2/1974 | Owens. |
| 4,052,525 | 10/1977 | Ide et al. |
| 4,289,823 | 9/1981 | Arkens ................................ 525/902 |

*Primary Examiner*—Paul R. Michl
*Attorney, Agent, or Firm*—Finnegan, Henderson, Farabow, Garrett & Dunner

[57] ABSTRACT

A sequentially produced multilayer acrylic thermoplastic resin composition is provided, which has (A) a hard first stage layer having a glass transition temperature (Tg) of at least 25° C., polymerized from methyl methacrylate alone or a monomer mixture predominantly comprising methyl methacrylate by emulsion polymerization; (B) a soft second stage layer, polymerized in the presence of the hard first stage layer from a monomer mixture comprising (B-1) a predominant proportion of an alkyl acrylate, (B-2) a minor proportion of a monoethylenically unsaturated monomer and/or a polyfunctional crosslinking monomer, and (B-3) a minor proportion of a polyfunctional graftlinking monomer by emulsion polymerization; said second stage layer exhibiting a Tg of not higher than 25° C. if the monomer mixture is polymerized in the absence of the first stage layer; and (C) a hard third stage layer, polymerized in the presence of the second stage layer and the first stage layer from methyl methacrylate alone or a monomer mixture predominantly comprising methyl methacrylate; said third stage layer exhibiting a Tg of at least 25° C. if the monomer charge is polymerized in the absence of the second stage layer and the first stage layer, and the third stage layer having decreasing molecular weights from the innermost portion to the outermost portion. The acrylic resin exhibits enhanced impact-, solvent- and stress-whitening resistance.

11 Claims, No Drawings

SEQUENTIALLY PRODUCED MULTILAYER ACRYLIC RESIN COMPOSITION

BACKGROUND OF THE INVENTION

1. Field of the Invention

This invention relates to an improved acrylic thermoplastic resin composition. More particularly, it relates to a sequentially produced multilayer acrylic thermoplastic resin composition which provides shaped articles having improved impact resistance, stress-whitening resistance, and solvent resistance.

2. Description of the Prior Art

Acrylic resin shaped articles are widely used both outdoors and indoors because they possess good transparency, weather resistance and thermoformability as well as an attractive appearance. However, acrylic resin shaped articles are not completely satisfactory in impact resistance and stress crack resistance. When they are exposed to certain solvents, they are subject to crazing or cracking. This is prominent particularly when there is internal and/or external stress. Thus, improvements in impact resistance and stress crack resistance have been eagerly sought after.

Many attempts have been heretofore made in order to enhance impact resistance and stress crack resistance. For example, it has been proposed to incorporate a rubber ingredient in a rigid acrylic thermoplastic resin in order to enhance the impact resistance. U.S. Pat. No. 3,793,402 teaches that the impact resistance can be enhanced without effect on the transparency by blending a rigid acrylic thermoplastic resin with a sequentially produced three- or more-stage polymer. U.S. Pat. No. 4,052,525 and Japanese Laid-open patent application No. 58,554/1978 teach an impact- and stress-whitening-resistant acrylic resin having an innermost hard layer, an elastomeric layer and an outermost hard layer and further having intermediate layers which interpose between the respective layers and have medial compositions between the adjacent layers. U.S. Pat. No. 4,180,529 teaches an impact- and stress-whitening-resistant acrylic resin having a first elastomeric layer, a second nonelastomeric layer, a third elastomeric layer and a fourth nonelastomeric layer.

Some attempts have also been made in order to improve the solvent resistance of acrylic resins. For example, Japanese Laid-open patent application No. 131,241/1974 teaches the incorporation of an alkyl acrylate or methacrylate oligomer in acrylic resins. Japanese Laid-open patent application Nos. 7,792/1978 and 99,190/1979 teach the copolymerization of methyl methacrylate with one or more certain acrylate or methacrylate monomers.

These attempts, however, have not been completely satisfactory because it is difficult to improve the impact resistance, the solvent resistance and the stress-whitening resistance to the desired extent, while maintaining the good transparency, weather resistance and thermoformability, inherent to acrylic resins.

SUMMARY OF THE INVENTION

It is a primary object of the present invention to provide an acrylic thermoplastic resin composition which possess good transparency, weather resistance and thermoformability as well as enhanced impact resistance, solvent resistance and stress-whitening resistance.

Other objects and advantages of the present invention will be apparent from the following description.

In accordance with the present invention, there is provided a sequentially produced multilayer acrylic resin composition which comprises:

(A) a relatively hard first stage layer having a glass transition temperature of at least 25° C., polymerized from methyl methacrylate alone or a monomer mixture comprising a predominant proportion of methyl methacrylate by an emulsion polymerization process;

(B) a relatively soft second stage layer, polymerized in the presence of a product containing the relatively hard first stage layer from a monomer mixture comprising (B-1) a predominant proportion of at least one alkyl acrylate, (B-2) a minor proportion of at least one monomer selected from the group consisting of copolymerizable monoethylenically unsaturated monomers and copolymerizable polyfunctional crosslinking monomers, and (B-3) 0.1% to 5.0% by weight, based on the weight of the monomer mixture, of a polyfunctional graftlinking monomer by an emulsion polymerization process; said relatively soft second stage layer being characterized as exhibiting a glass transition temperature of not higher than 25° C. if the monomer mixture is polymerized in the absence of the relatively hard first stage layer; and (C) a relatively hard third stage layer, polymerized in the presence of a product containing the relatively soft second stage layer and the relatively hard first stage layer from methyl methacrylate alone or a monomer mixture comprising a predominant proportion of methyl methacrylate; said relatively hard third stage layer being characterized as exhibiting a glass transition temperature of at least 25° C. if the monomer or monomer mixture is polymerized in the absence of the product containing the relatively soft second stage layer and the relatively hard first stage layer, and further characterized as having decreasing molecular weights from the innermost portion to the outermost portion.

DESCRIPTION OF THE PREFERRED EMBODIMENTS

The acrylic thermoplastic resin composition of the present invention is comprised of the three layers (A), (B) and (C). The innermost layer, i.e., the relatively hard first stage layer, is an emulsion polymerization product comprised of a methyl methacrylate homopolymer copolymer. The methyl methacrylate copolymer is derived from a monomer mixture of a predominant proportion, more specifically at least 80% by weight, of methyl methacrylate and a minor proportion, more specifically not more than 20% by weight, of at least one copolymerizable monomer. If the proportion of methyl methacrylate in the monomer mixture is too small, the resulting acrylic resin becomes poor in transparency, weather resistance, appearance and thermoformability. As the monomer copolymerizable with methyl methacrylate, there can be mentioned, for example, ethyl methacrylate, propyl methacrylate, butyl methacrylate, allyl methacrylate, methyl acrylate, ethyl acrylate, propyl acrylate, butyl acrylate, methacrylic acid, acrylic acid, acrylonitrile, vinyl acetate, vinyl chloride, and styrene.

The relatively hard first stage layer should have a glass transition temperature (Tg) of at least 25° C., preferably at least 50° C. If the first stage layer has a Tg of lower than 25° C., the resulting acrylic resin shaped articles are poor in stress-whitening resistance.

The relatively soft second stage layer (B) is an emulsion polymerization product of a monomer mixture comprising a predominant proportion of at least one alkyl acrylate, which product is prepared by an emulsion polymerization process carried out in the presence of a product of the relatively hard first stage layer. The second stage layer should be comprised of an acrylic copolymer rubber having a composition such that the copolymer rubber exhibits a glass transition temperature of not higher than 25° C., preferably not higher than 0° C., if the monomer mixture is polymerized in the absence of the relatively hard first stage layer. If the copolymer rubber exhibits a Tg of higher than 25° C., the resulting acrylic resin becomes poor in impact resistance.

The monomer mixture for the second stage layer (B) comprises, based on the weight of the monomer mixture, 55% to 99.9% by weight of at least one alkyl acrylate, 0% to 40% by weight of at least one copolymerizable monoethylenically unsaturated monomer and/or at least one copolymerizable polyfunctional crosslinking monomer, and 0.1% to 5.0% by weight of a polyfunctional graftlinking monomer having different functional groups.

Preferable alkyl acrylates in the second stage layer are those which have 1 to 8 carbon atoms in the alkyl group. Of these, n-butyl acrylate and 2-ethylhexyl acrylate are most preferable. These alkyl acrylate polymers have a refractive index different from that of methyl methacrylate polymers, and, therefore, if the second stage layer is comprised solely of such an alkyl acrylate polymer, the resulting acrylic resin shaped article becomes opaque white. Accordingly, if a transparent acrylic resin shaped article is desired, the alkyl acrylate should be copolymerized with other monomers for the preparation of the relatively soft second stage layer so that the second stage layer has a refractive index in agreement with that of a methyl methacrylate polymer.

The monoethylenically unsaturated monomers to be copolymerized with the alkyl acrylate include, for example, those which are hereinbefore described with respect to the relatively hard first stage layer (A).

In order to impart an appropriate degree of elasticity to the relatively soft second stage layer, the alkyl methacrylate may be copolymerized with a minor proportion of a polyfunctional crosslinking monomer or monomers. As the polyfunctional crosslinking monomers, there can be mentioned conventional crosslinking agents such as divinyl compounds, diallyl compounds, diacrylic compounds and dimethacrylic compounds.

The alkyl acrylate monomer mixture used for the preparation of the relatively soft second stage layer should contain 0.1 to 5.0% by weight, based on the weight of the monomer mixture, of a polyfunctional graftlinking monomer so that the second stage layer is chemically bonded with the subsequently produced third stage layer (C). Suitable graftlinking monomers are polyfunctional monomers which have different functional groups and which include, for example, allyl esters of acrylic acid, methacrylic acid, maleic acid or fumaric acid.

The relatively hard third stage layer (C) is a polymerization product of methyl methacrylate or a monomer mixture comprising a predominant proportion of methyl methacrylate, which product is prepared by an emulsion polymerization process carried out in the presence of a product containing the relatively soft second stage layer (B) and the relatively hard first stage layer (A). The third stage layer (C) should be comprised of a methyl methacrylate homopolymer or a copolymer comprising at least 80% by weight of methyl methacrylate and not more than 20% by weight of at least one alkyl acrylate or other copolymerizable monoethylenically unsaturated monomer. The third stage layer (C) should exhibit a glass transition temperature of at least 25° C. if the monomer or monomer mixture is polymerized in the absence of the product containing the second stage layer and the first stage layer. The alkyl acrylates and other copolymerizable monoethylenically unsaturated monomers to be copolymerized with methyl methacrylate may be selected from those which are hereinbefore described with respect to the relatively hard first stage layer (A) and the relatively soft second stage layer (B).

The relatively hard third stage layer (C) should have a structure such that the molecular weight thereof decreases from the innermost portion to the outermost portion. Such a structure can be formed by sequentially polymerizing the monomer or monomer mixture for the third stage layer (C) in two or more stages, wherein, for example, the amount of the chain transfer agent used is increased from the first stage for the formation of the innermost layer to the last stage for the formation of the outermost layer, whereby the molecular weight in the relatively hard third stage layer gradually decreases from the innermost layer to the outermost layer. The molecular weight of each stage polymer in the third stage layer (C) can be determined on a polymer which has been prepared by polymerizing the respective monomer or monomer mixture alone (i.e., in the absence of a polymerization product obtained in the previous stage) under the same conditions as those employed in the sequential polymerization carried out in the presence of a polymerization product of the previous stage.

By the provision of the molecular weight gradient decreasing from the innermost portion to the outermost portion in the third stage layer (C), stress-whitening resistance of the acrylic resin can be enhanced to the desired extent. If the molecular weight is uniform over the entire thickness of the third stage layer (C), the resulting acrylic resin is poor in stress-whitening resistance and/or flow characteristics, although the extent thereof varies depending upon the particular molecular weight.

It is preferable that the molecular weight of the innermost portion of the third stage layer (C) be in the range of from 300,000 to 5,000,000, more preferably from 500,000 to 2,000,000. If the molecular weight in the innermost portion is lower than 300,000, the desired stress-whitening resistance cannot be obtained. In contrast, a molecular weight of the innermost portion exceeding 5,000,000 cannot be obtained unless the polymerization is effected under special conditions and, thus, such a high molecular weight is not advantageous.

It is also preferable that the molecular weight of the outermost portion of the third stage layer (C) be in the range of from 60,000 to 200,000, more preferably from 80,000 to 150,000. If the molecular weight of the outermost portion exceeds 200,000, the flow characteristics of the resulting acrylic resin are reduced. In contrast, if the molecular weight of the outermost portion is lower than 60,000, the solvent resistance and mechanical strengths of the resulting acrylic resin are reduced.

The structure of the relatively hard first stage layer (A) and that of the relatively soft second stage layer (B) are not particularly limited, provided that these layers satisfy the specified requirements regarding the glass transition point and the monomer composition.

Modifications can be made on the first stage layer (A) and the second stage layer (B). For example, one or more intermediate layers may be formed between the first stage layer (A) and the second stage layer (B), which intermediate layers may either have gradually changing monomer compositions or a so-called graft polymer structure, namely, have incorporated therein a large amount of a polyfunctional graftlinking agent. Three or more layers may be formed as the second stage layer (B), which layers contain a polyfunctional crosslinking agent and/or a polyfunctional graftlinking agent at different concentrations.

The multilayer acrylic thermoplastic resin of the present invention is prepared by a sequential multistage emulsion polymerization process, in which a monomer charge of any stage is polymerized onto or in the presence of a preformed latex prepared by the polymerization of the previous monomer charge. The polymerization for the preparation of the second stage layer and the third stage layer should be carried out under conditions such that new additional particles are not formed after the formation of the first stage particles. For this requirement, the so-called seed polymerization process is advantageous. Thus, after the first stage polymerization, no additional emulsifier should be added into the monomer charge of any succeeding stage or, if added, the amount of the additional emulsifier should be minimized to avoid the formation of additional particles. The formation of new additional particles can easily be detected by an electron microscope.

The first stage layer (A) is prepared preferably by a process wherein the monomer or monomer mixture and a polymerization initiator such as a peroxide catalyst or a redox catalyst are incorporated in an aqueous solution containing an emulsifier and other additives, and, the mixture is stirred during the polymerization. After completion of the first stage polymerization, a monomer charge for the second stage polymerization, which contains the monomer or monomer mixture, a polyfunctional graftlinking monomer, and an optional polyfunctional crosslinking agent, is added to the product of the first stage polymerization. If desired, a polymerization initiator may be added to the mixture containing the monomer charge for the second stage polymerization. After completion of the second stage polymerization, monomer charges for the layers in the third stage layers are sequentially added to the product of the second stage polymerization whereby the third stage layer (C) of a multilayer structure is formed. For the preparation of the third stage layer (C) of a multilayer structure having decreasing molecular weights from the innermost portion to the outermost portion, the amount of a chain transfer agent such as alkyl mercaptan is increased from the monomer charge for the innermost portion to that for the outermost portion. After the multistage polymerization for the third stage layer (C), the polymer latex is coagulated and the polymer is separated therefrom for recovery.

The multilayer acrylic thermoplastic resin of the present invention can be shaped, either as it is or after it is pelletized, into shaped articles, for example, by an injection nolding or extrusion process. The acrylic resin of the present invention may be blended with conventional acrylic resins (i.e., methyl methacrylate polymer resins). The proportion of the acrylic resin of the present invention to the conventional acrylic resin can be varied depending upon the intended use of the blend resin. The conventional acrylic resin to be blended with the acrylic resin of the present invention may be any of those which are prepared by a known polymerization process such as a bulk, suspension, emulsion or solution polymerization process. The blending of the acrylic resin of the present invention with the conventional acrylic resin may be effected in a known manner.

The multilayer acrylic resin of the present invention exhibits enhanced stress-whitening resistance, impact resistance and solvent resistance. The acrylic resin of the present invention is also advantageous in that good weather resistance can easily be imparted thereto. In general, impact-resistant acrylic resins are superior to other impact-resistant resins in weather resistance. However, mechanical strengths of impact-resistant acrylic resins are liable to be gradually reduced during long outdoor use. In order to overcome this defect and enhance the weather resistance, an ultraviolet absorber is usually incorporated in the acrylic resin. The weather resistance of the acrylic resin of the present invention can be improved to a great extent by incorporating a weathering stabilizer such as an ultraviolet absorber in the innermost portion having the highest molecular weight among the third stage layer having a multilayer structure. The amount of the weathering stabilizer used is preferably from 100 to 10,000 ppm based on the weight of the innermost portion.

The invention will be further illustrated by the following examples wherein characteristics of acrylic resin shaped articles were determined as follows.

(1) Solvent resistance

An injection molded specimen is supported on a fulcrum so that one end thereof is clamped in a stationary grip. A load is applied to the other end to create a surface stress of 400 kg/cm$^2$. Gasoline is dropped on the fulcrum area. The solvent resistance is evaluated in terms of the period of time spanning from the dropping of the gasoline to the breaking of the specimen.

(2) Impact resistance (i) A drop-weight impact test is conducted by using a Du Pont type drop-weight impact tester supplied by Toyo Seiki K.K. A weight is dropped on a plurality of specimens having a thickness of 3 mm. When the number of specimens that are broken becomes equal to the number of specimens that are not broken, the drop-weight impact strength is calculated from the following equation.

$$\text{Drop-weight impact strength} = \frac{\text{Weight (kg)} \times \text{Drop height (cm)}}{\text{Thickness of specimen (cm)}}$$

(ii) The Izod impact strength is determined according to ASTM-D256.

(3) Stress-whitening

A specimen is drawn to a predetermined elongation value (30%), and the state of whitening is observed by the naked eye.

(4) Flow characteristics

The melt flow index (hereinafter referred to as "MI" for brevity) is determined according to ASTM-D1238 at a temperature of 230° C. and a load of 3.8 kg.

The molecular weight of the polymer layers in the third stage of each acrylic resin product is determined on a polymer specimen prepared by polymerizing the monomer charge alone, namely, in the absence of the previous stage polymer product. The molecular weight is calculated from the intrinsic viscosity as measured in chloroform at 25° C.

The glass transition temperature (Tg) is determined by using a dilatometer.

EXAMPLE 1

A 10 l volume beaker equipped with a stirrer and a condenser was charged with 5.7 l of distilled water, 20 g of dioctyl sodium sulfosuccinate (emulsifier) and 1.2 g of Rongalit (reducing agent). The content was stirred to form a uniform solution. A monomer charge for the preparation of the first stage layer (A), i.e., a uniform solution comprised of 220 g of methyl methacrylate (hereinafter referred to as "MMA" for brevity), 3.0 g of n-butyl acrylate (hereinafter referred to as "BA" for brevity), 0.8 g of allyl methacrylate (hereinafter referred to as "ALMA" for brevity), and 0.2 g of diisopropylbenzene hydroperoxide (hereinafter referred to as "PBP" for brevity) was incorporated into the beaker where the monomer charge was maintained at 80° C. to be thereby polymerized. About 15 minute later, the first stage polymerization completed. The resultant polymer exhibited a Tg of 108° C.

To the first stage polymerization product, a monomer charge for the preparation of the second stage layer (B) was dropwise added over a period of one hour. The monomer charge consisted of 1,270 g of BA, 320 g of styrene (hereinafter referred to as "st" for brevity), 20 g of diethyleneglycol diacrylate (hereinafter referred to as "DEGA" for brevity), 13.0 g of ALMA, and 1.6 g of PBP. About 40 minute after the completion of the dropwise addition, the second stage polymerization was completed. The second stage polymer exhibited a Tg of $-38°$ C., as polymerized in the same manner as described above but in the absence of the first stage polymerization product.

To the second stage polymerization product, a monomer charge for the preparation of the innermost layer in the third stage layer (C) was added, which monomer charge was a uniform solution consisting of 340 g of MMA, 2.0 g of BA, 0.3 g of PBP, and 0.1 g of n-octyl mercaptan (hereinafter referred to as "OM" for brevity). About 15 minutes, later the polymerization was completed. The innermost layer of the third stage layer (C) exhibited a molecular weight of 1,220,000 and a Tg of 109° C., as polymerized in the same manner as described above but in the absence of the second stage polymerization product.

To the polymerization product of the innermost (first) layer of the third stage layer (C), a monomer charge for the preparation of the outermost (second) layer in the third stage layer (C) was added, which monomer charge was the same as that for the innermost (first) layer of the third stage layer (C) except that the content of OM was 1.0 g instead of 0.1 g. About 15 minutes later, the polymerization was completed. The outermost layer of the third stage layer (C) exhibited a molecular weight of 117,000 and a Tg of 108° C., as polymerized in the same manner as described above but in the absence of the innermost layer of the third stage layer (C).

Thereafter, the polymerization product was heated to 95° C. and maintained at that temperature for one hour. The resultant polymer emulsion was put into an aqueous 0.5 wt. % aluminum chloride solution whereby the polymer was coagulated. The polymer was washed with warm water five times and then dried to obtain a white flock-like acrylic resin product.

EXAMPLE 2

Following the same procedure as described in Example 1, a multilayer acrylic resin product was prepared wherein the a multilayer acrylic resin product was prepared wherein the monomer charges having the compositions shown in Table I, below, were used for the preparation of the third stage layer. All other conditions remained substantially the same.

TABLE I

| Third stage layer | Ingredient (g) | | | | Molecular weight |
|---|---|---|---|---|---|
| | MMA | BA | PBP | OM | |
| First (innermost) layer | 230 | 1.3 | 0.2 | 0 | 1,980,000 |
| Second (intermediate) layer | " | " | " | 0.5 | 360,000 |
| Third (outermost) layer | " | " | " | 1.0 | 89,000 |

COMPARATIVE EXAMPLES 1 THROUGH 3

Following the same procedure as described in Example 1, multilayer acrylic resin products were prepared wherein the monomer charges having the compositions shown in Table II, below, were used for the preparation of the third stage layers. All other conditions remained substantially the same.

TABLE II

| Comparative Example | Ingredient (g) | | | | Molecular weight |
|---|---|---|---|---|---|
| | MMA | BA | PBP | OM | |
| 1 | 690 | 4 | 0.6 | 0 | 1,520,000 |
| 2 | " | " | " | 1.1 | 400,000 |
| 3 | " | " | " | 2.7 | 91,000 |

EXAMPLE 3

Following the same procedure as described in Example 1, a multilayer arcylic resin product was prepared wherein the monomer charges having the compositions shown in Table III, below were used for the preparation of the stage layers. All other conditions remained substantially the same.

TABLE III

| | | Ingredient (g) | | | | | | | Molecular weight |
|---|---|---|---|---|---|---|---|---|---|
| | | MMA | BA | st | ALMA | DEGA | PBP | OM | |
| First stage layer | | 220 | 1.3 | 0 | 0 | 0 | 0.2 | 0 | — |
| Second stage layer | | 0 | 700 | 170 | 8 | 8 | 1 | 0 | — |
| Third stage layer | Innermost layer | 220 | 1.3 | 0 | 0 | 0 | 0.2 | 0 | 1,800,000 |
| | Intermediate layer | 220 | 1.3 | 0 | 0 | 0 | 0.2 | 0.5 | 300,000 |

TABLE III-continued

|  | Ingredient (g) | | | | | | | Molecular |
|---|---|---|---|---|---|---|---|---|
|  | MMA | BA | st | ALMA | DEGA | PBP | OM | weight |
| Outermost layer | 1000 | 6 | 0 | 0 | 0 | 1 | 3.5 | 108,000 |

REFERENCE EXAMPLE

Each of the multilayer acrylic resin products prepared in Examples 1 and 2 and Comparative Examples 1, 2 and 3 was blended with a commercially available methyl methacrylate polymer resin (trademark "Delpet" supplied by Asahi Kasei Kogyo K.K.) at a ratio of 1:1 by weight. The blend was extruded through an extruder into a rod, and the rod was cut into pellets. The pellets were injection molded into shaped article specimens. Characteristics of the specimens are shown in Table IV, below.

Similarly, injection molded specimens were prepared from the multilayer acrylic resin product obtained in Example 3 wherein pellets were prepared from the multilayer acrylic resin product alone, i.e., without blending it with Delpet. Characteristics of these specimens are also shown in Table IV, below.

TABLE IV

| Run No. | Drop-weight impact strength (kg · cm/cm) | Solvent resistance (min.) | Stress-whitening (at 30% elongation) | MI (g/10 min.) |
|---|---|---|---|---|
| Example 1 | 440 | More than 90 | Little or no whitening | 0.3 |
| Example 2 | 460 | More than 90 | Little or no whitening | 0.4 |
| Comparative Example 1 | 330 | More than 90 | Little or no whitening | 0.1 |
| Comparative Example 2 | 370 | More than 90 | Slightly whitened | 0.2 |
| Comparative Example 3 | 400 | More than 90 | Whitened | 0.4 |
| Example 3 | 430 | More than 90 | Not whitened | 0.3 |

COMPARATIVE EXAMPLE 4

Following the same procedure as described in Comparative Example 3, a multilayer acrylic resin product was prepared wherein 200 ppm of Tinuvin P (ultraviolet light absorber, supplied by Nippon Ciba-Geigy K.K.) was incorporated in each of the layers. All other conditions remained substantially the same. A molded article specimen was prepared therefrom and its Izod impact strength was tested after 2,000 hour sunshine weatherometer exposure. The test results are shown in Table V, below.

For comparison purposes, the Izod impact test was conducted on a molded article specimen prepared without the use of an ultraviolet light absorber from the multilayer acrylic resin product obtained in Comparative Example 3. The test results are also shown in Table V, below.

EXAMPLE 4

Following the same procedure as described in Example 2, a multilayer acrylic resin product was prepared wherein Tinuvin P was incorporated only in the innermost layer of the third stage layer. The amount of Tinuvin P used was the same as the total amount thereof used in Comparative Example 4. All other conditions remained substantially the same. A molded article specimen was prepared therefrom and its Izod impact strength was tested in the same manner as described in Comparative Example 4. The test results are also shown in Table V, below.

TABLE V

|  | Izod impact strength (V-notched) (kg-cm/cm) Weatherometer exposure time (Hr) | | |
|---|---|---|---|
|  | 0 | 1000 | 2000 |
| Comparative Example 3 | 4.8 | 1.8 | 1.4 |
| Comparative Example 4 | 4.6 | 3.0 | 1.5 |
| Example 4 | 5.0 | 4.8 | 3.2 |

We claim:

1. A sequentially produced multilayer acrylic resin composition which comprises:
   (A) a relatively hard first stage layer having a glass transition temperature of at least 25° C., polymerized from methyl methacrylate alone or a monomer mixture comprising a predominant proportion of methyl methacrylate by an emulsion polymerization process;
   (B) a relatively soft second stage layer, polymerized in the presence of a product containing the relatively hard first stage layer from a monomer mixture comprising (B-1) a predominant proportion of at least one alkyl acrylate, (B-2) a minor proportion of at least one monomer selected from the group consisting of copolymerizable monoethylenically unsaturated monomers and copolymerizable polyfunctional crosslinking monomers, and (B-3) 0.1% to 5.0% by weight, based on the weight of the monomer mixture, of a polyfunctional graftlinking monomer by an emulsion polymerization process; said relatively soft second stage layer being characterized as exhibiting a glass transition temperature of not higher than 25° C. if the monomer mixture is polymerized in the absence of the product of the relatively hard first stage layer; and
   (C) a relatively hard third stage layer, polymerized in the presence of a product containing the relatively soft second stage layer and the relatively hard first stage layer from methyl methacrylate alone or a monomer mixture comprising a predominant proportion of methyl methacrylate; said relatively hard third stage layer being characterized as exhibiting a glass transition temperature of at least 25° C. if the monomer or monomer mixture is polymerized in the absence of the product containing the relatively soft second stage layer and the relatively hard first stage layer, and further characterized as having decreasing molecular weights from the innermost portion to the outermost portion.

2. A sequentially produced multilayer acrylic resin composition according to claim 1 wherein a monomer charge for the relatively hard first stage layer (A) comprises methyl methacrylate alone or at least 80% by weight of methyl methacrylate and not more than 20% by weight of at least one copolymerizable monomer.

3. A sequentially produced multilayer acrylic resin composition according to claim 1 or 2 wherein the relatively hard first stage layer (A) has a glass transition temperature of at least 50° C.

4. A sequentially produced multilayer acrylic resin composition according to claim 1 wherein the monomer mixture for the relatively soft second stage layer (B) comprises, based on the weight of the monomer mixture, (B-1) 55% to 99.9% by weight of at least one alkyl acrylate, (B-2) 0% to 40% by weight of at least one monomer selected from the group consisting of copolymerizable monoethylenically unsaturated monomers and copolymerizable polyfunctional crosslinking monomers and (B-3) 0.1% to 5.0% by weight of a polyfunctional graftlinking monomer which has different functional groups.

5. A sequentially produced multilayer acrylic resin composition according to claim 1 or 4 wherein the alkyl acrylate has 1 to 8 carbon atoms in the alkyl group.

6. A sequentially produced multilayer acrylic resin composition according to claim 1 or 4 wherein the relatively soft second stage layer (B) exhibits a glass transition temperature of not higher than 0° C. if the monomer mixture is polymerized in the absence of the product of the relatively hard first stage layer (A).

7. A sequentially produced multilayer acrylic resin composition according to claim 1 wherein a monomer charge for the relatively hard third stage layer (C) comprises methyl methacrylate alone or at least 80% by weight of methyl methacrylate and not more than 20% by weight of at least one alkyl acrylate or other copolymerizable monoethylenically unsaturated monomer.

8. A sequentially produced multilayer acrylic resin composition according to claim 1 wherein the relatively hard third stage layer (C) is a sequentially polymerized product having a multilayer structure, the molecular weight of which gradually decreases from the innermost layer to the outermost layer.

9. A sequentially produced multilayer acrylic resin composition according to claim 1 or 8 wherein the innermost portion or layer has a molecular weight of from 300,000 to 5,000,000 and the outermost portion or layer has a molecular weight of from 60,000 to 200,000.

10. A sequentially produced multilayer acrylic resin composition according to claim 1 or 8 wherein the innermost portion of the relatively hard third stage layer (C) has incorporated therein a weathering stabilizer.

11. A sequentially produced multilayer acrylic resin composition which consists essentially of:
(A) a relatively hard first stage layer having a glass transition temperature of at least 25° C., polymerized from methyl methacrylate alone or a monomer mixture comprising a predominant proportion of methyl methacrylate by an emulsion polymerization process;
(B) a relatively soft second stage layer, polymerized in the presence of a product containing the relatively hard first stage layer from a monomer mixture comprising (B-1) a predominant proportion of at least one alkyl acrylate, (B-2) a minor proportion of at least one monomer selected from the group consisting of copolymerizable monoethylenically unsaturated monomers and copolymerizable polyfunctional crosslinking monomers, and (B-3) 0.1% to 5.0% by weight, based on the weight of the monomer mixture, of a polyfunctional graftlinking monomer by an emulsion polymerization process; said relatively soft second stage layer being characterized as exhibiting a glass transition temperature of not higher than 25° C. if the monomer mixture is polymerized in the absence of the product of the relatively hard first stage layer, and
(C) a relatively hard third stage layer, polymerized in the presence of a product containing the relatively soft second stage layer and the relatively hard first stage layer from methyl methacrylate alone or a monomer mixture comprising a predominant proportion of methyl methacrylate; said relatively hard third stage layer being characterized as exhibiting a glass transition temperature of at least 25° C. if the monomer or monomer mixture is polymerized in the absence of the product containing the relatively soft second stage layer and the relatively hard first stage layer, and further characterized as having decreasing molecular weights from the innermost portion to the outermost portion.

* * * * *